United States Patent [19]
Pirlet

[11] 3,855,523
[45] Dec. 17, 1974

[54] A METHOD AND AN APPARATUS FOR MEASURING THE CAMBER OF A ROLL

[75] Inventor: Robert Alfred Pirlet, Angleur, Belgium

[73] Assignee: Centre de Recherches Metallurgiques - Centrum voor Research in de Metallurgie, Brussels, Belgium

[22] Filed: Oct. 12, 1971

[21] Appl. No.: 188,012

[30] Foreign Application Priority Data
Oct. 22, 1970  Belgium .............................. 757893

[52] U.S. Cl. .............................. 324/34 D, 33/174 L
[51] Int. Cl. .......................................... G01r 33/00
[58] Field of Search ............ 324/34 R, 34 D, 34 PS, 324/40; 33/143 L, 147 N, 174 A, 174 L, 178 R, 178 E

[56] References Cited
UNITED STATES PATENTS

| | | | |
|---|---|---|---|
| 2,537,731 | 1/1951 | Angell | 324/34 TK |
| 2,765,076 | 10/1956 | Casler et al. | 33/174 E |
| 3,573,444 | 4/1971 | Kawabata | 33/174 L |

FOREIGN PATENTS OR APPLICATIONS
240,348  12/1960  Australia .......................... 33/174 E

*Primary Examiner*—Robert J. Corcoran
*Attorney, Agent, or Firm*—Holman & Stern

[57] ABSTRACT

Two or more pairs of distance measuring elements, such as inductive displacement transducers, are arranged at spaced positions along the roll. The elements of each pair are diametrically opposed with respect to the cross-section of the roll and their axes lie along the diameter. Each element is contactlessly spaced from the surface of the roll, and the elements are constrained to follow the translational movements of the roll so that the elements of each pair remain diametrically opposed at an approximately constant distance apart. The distance of each element from the surface of the roll is measured, and a value representing the camber is calculated from the measured distances.

30 Claims, 4 Drawing Figures

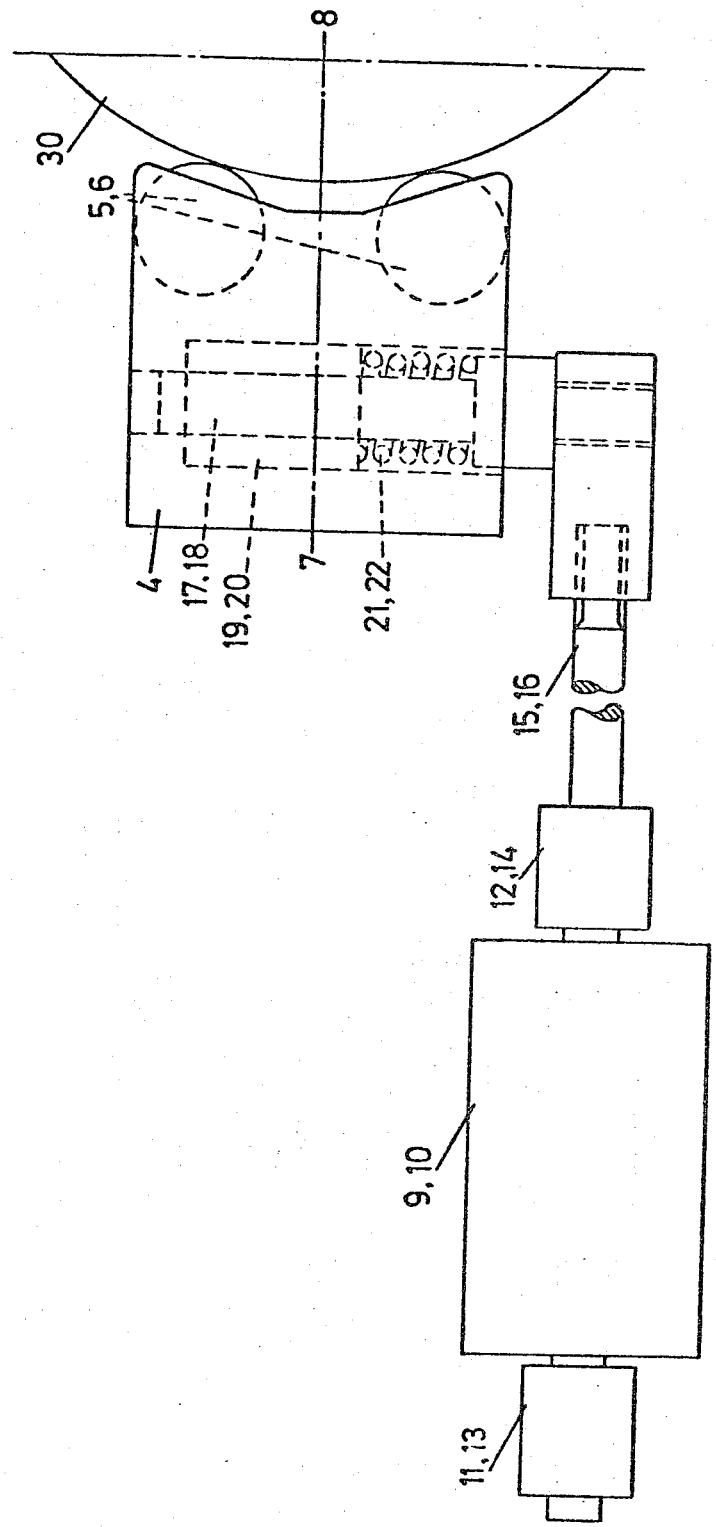

3,855,523

A METHOD AND AN APPARATUS FOR MEASURING THE CAMBER OF A ROLL

BACKGROUND OF THE INVENTION

The present invention relates generally to a method and arrangement for measuring the camber of a roll and, in particular but not solely, it relates to a strip-rolling-mill roll during operation.

This text will deal, above all, with rolling-mill rolls, but the invention is equally applicable to other rolls, whose camber is to be measured. By definition, the chamber of a rolling-mill roll is equal to the difference between the diameter measured in the middle of the length of the roll, and the diameter measured at one of the two ends of the working surface of the roll, which difference may characterize a convexity or a concavity. The chamber may be expressed in units of length, generally micrometers, or in percentages.

During the rolling operation, the rolls are subjected to wear and deformation processes which affect their characteristics and result in impairment, to a greater or lesser extent, of the quality of the rolled products. It is, therefore, important to be able to measure the chamber of these rolls during operation, in order to improve the quality of these products and avoid rejects.

PRIOR TECHNIQUES

It has already been recommended that use be made of pick-ups (distance measuring devices) which are located at a suitable distance from the roll in such a way that the value of the roll camber can easily be deduced from the size of the distance separating these pick-us from the cylinder working surface which is turned towards them.

For initial calibration, use is generally made of a roll whose camber is known from the direct and very precise measuring operations carried out in a turning workshop, and measurements of this kind present absolutely no difficulty. The roll is placed in position in the rolling-mill housing and the measuring pick-ups are installed around the roll. The apparatus is then adjusted in such a way that calculations carried out on the basis of measurements supplied by the pick-ups when the roll is at rest supply, to within a constant, the same value for the camber as is already known from the direct measurements, the constant representing the coefficient of calibration of the results obtained.

One technique which is employed with devices of this kind consists in first measuring the initial camber of the roll before operation, regarding this initial value of the camber as a reference value, and observing the development of the camber during rolling, in relation to this reference value.

The major problem to be solved with methods of this kind results from the fact that the pick-ups are subjected to vibrations, of which that component which is directed along a diameter has the effect of changing the distance between the pick-up and the working surface of the roll, and therefore of influencing measurement of the chamber to a non-inconsiderable extent.

All these methods are distinguished from one another precisely by the specific solution given to this problem.

SUMMARY OF THE INVENTION

The present invention aims to provide a method of the type described above, that is to say involving the use of measuring pick-ups located at a suitable distance from the cylinder, which constitutes a particularly interesting solution to the vibration problems mentioned above.

The present invention provides a method of measuring the camber of a roll, in which at least two pairs of contactless distance measuring elements are arranged at spaced positions along the roll, the distance measuring elements of each pair being diametrically opposed with respect to the cross-section of the roll, with their measuring axes lying substantially on the prolongation of a given diameter of the roll, each element being contactlessly spaced from the surface of the roll, the elements being constrained to follow the translational movements of the roll so that the elements of each pair remain diametrically opposed at a substantially constant distance apart, the distance of each element from the surface of the roll along the corresponding diameter being measured, and a value representing the camber being calculated from the measured distances.

A value which is representative of the camber of the roll is advantageously calculated, on the basis of measurements of the distance separating each distance measuring element (hereinafter referred to as a pick-up) from the surface of the roll which is turned towards it, by adding up, on the one hand, those distances relating to the pair of pick-ups located in the middle of the length of the roll and, on the other hand, those distances relating to the pair of pick-ups located at one of the ends of the working surface of the roll, and by subtracting these totals one from the other.

For the purpose of subjecting the pick-ups to a displacement which is dependent upon the movement of the roll in such a way that the pick-ups constituting each pair remain aligned in the extension of the diameter in question, whatever the displacements and deformations to which the roll may be subjected, the pick-ups located on the same side of the roll are disposed on a rigid longitudinal member mounted on roller and, throughout the duration of the measuring operations, there is exerted upon the longitudinal member sufficient force to keep the rollers in contact with the surface of the roll.

These rollers are preferably four in number and are disposed in pairs, the rollers of each of these pairs being located one above the other.

It is advantageous to dispose the two pairs of rollers symmetrically and approximately at the ends of the longitudinal member, in such a way that the rollers bear against the roll only outside its effective working surface.

With a view to facilitating the bringing of the rollers into contact with the surface of the roll, use may be made, as the connection between the longitudinal member and a mechanism for applying the above-mentioned force, of an articulation having a number of degrees of freedom which is suited to the form of embodiment adopted.

According to one manner of operation of the invention, the articulated connection between the longitudinal member and the mechanism applying the force for bringing the rollers into contact with the surface of the cylinder, has a vertical axis.

One of the degrees of freedom available to the articulated connection between the longitudinal member and the forceapplying mechanism, is rotation about the vertical axis of the connection.

Another degree of freedom available to the connection between the longitudinal member and the force-applying mechanism, is vertical translation of the longitudinal member along the vertical axis of the connection.

A third degree of freedom which the connection between the longitudinal member and the force-applying mechanism may advantageously possess, is rotation about an axis parallel to the longitudinal axis of the longitudinal member.

A fourth degree of freedom which the connection between the longitudinal member and the force-applying mechanism may advantageously prossess, is horizontal translation of the vertical axis of the connection, parallel to the longitudinal axis of the longitudinal member.

The connection between the longitudinal member and the force-applying mechanism may advantageously have two positions of application on the longitudinal member. These two points of application are advantageously located in such a way that each of them is situated at right angles to the corresponding pair of rollers.

In the case of an articulated connection having two points of application, the degree of freedom consisting in a horizontal translation movement of the vertical axis of the connection, parallel to the longitudinal axis of the longitudinal member, is contrived at only one of these two points of application.

The measuring pick-ups are preferably fixed on the longitudinal member in such a way that their axes are substantially perpendicular to the longitudinal axis of the longitudinal member, and are substantially horizontal.

In view of this starting position, it is understandable that the degrees of freedom of the connection between the longitudinal member and the mechanism for applying force when the rollers are in contact with the surface of the roll, have the effect of keeping the axis of the pick-ups and the axis of rotation of the cylinder in the same plane, which is preferably horizontal.

A suitable arrangement for measuring the camber of a roll comprises two rigid longitudinal members situated one on each side of the roll and each provided, on the one hand, with at least two distance measuring elements (pick-ups) and, on the other hand, with two pairs of rollers which are located symmetrically and approximately at the ends of the longitudinal member; two mechanisms for applying to the respective longitudinal members a force which is intended to ensure contact between the rollers and the surface of the roll; an articulated connection joining each longitudinal member to the corresponding force-applying mechanism; and means for securing the mechanisms to a stable support.

The rollers are advantageously cambered, which makes it possible to prevent the contact between the rollers and the surface of the roll from leaving tracks on the surface. It should be noted that this contact preferably occurs outside the effective working surface of the roll. These rollers may be made of steel which preferably has a hardness comparable to that of the roll.

The force-applying mechanism may be constituted by at least one horizontal jack, the axis of which is substantially perpendicular to the longitudinal axis of the longitudinal member. The jack or jacks are preferably controlled pneumatically.

In the event of the articulated connection which joins the longitudinal member and the force-applying mechanism, having two points of application on the longitudinal member, the mechanism may comprise a single jack, the rod of which is provided with a driving bar and with two arms connecting the driving bar to the two points on the longitudinal member, while the driving bar is also provided with a pivot which connects the bar to the rod of the jack.

In this same case, in which the articulated connection joining the longitudinal member and the force-applying mechanism has two points of application on the longitudinal member, the mechanism may comprise two jacks, the rods of which are directly connected to the two points on the longitudinal member, with these rods being substantially parallel to one another and perpendicular to the longitudinal axis of the longitudinal member.

The rod of each jack advantageously slides in two fixed bearings located on both sides of the cylinder of the jack, which makes it possible to prevent longitudinal displacements of the cylinder.

The articulated connection linking the longitudinal member and the force-applying mechanism is advantageously constituted by, on the one hand, a vertical swivel-pin which is integral with the horizontal rod of the jack or jacks and, on the other hand, a vertical bearing which is mounted on the longitudinal member.

In order to permit vertical translation of the vertical bearing along the vertical swivel-pin which is integral with the force-applying mechanism, the bearing may be constituted by a cylindrical ball bearing.

Furthermore, in order to facilitate self-centering of the longitudinal member in relation to the roll, in such a way that the axes of the pick-ups and the axis of rotation of the roll define a substantially horizontal plane, the vertical swivel-pin which is integral with the force-applying mechanism is provided with a vertical acting spring through the agency of which the longitudinal member is supported around the swivel-pin.

If the articulated connection joining the longitudinal member and the force-applying mechanism has two points of application on the longitudinal member, and if the mechanism comprises two jacks, the vertical bearing at one only of these two points is advantageously provided with a bore which is intended to slide along a gudgeon disposed in the longitudinal member, in a direction parallel to the longitudinal axis of the said longitudinal member, which enables the bearing to move in this same direction in a groove formed for this purpose in the aforesaid longitudinal member.

The distance measuring elements (pick-ups) are preferably contactless displacement transducers of the inductive type, such as those of the TW series produced by Vibro-Meter AG. With these, a change in the distance between the transducer and the roll causes a change in the mutual inductance of the transducer coils, resulting in a change in the output voltage.

With this type of pick-up, there is usually an optimum distance at which the pick-up gives readings of maximum accuracy, and each pick-up should be set at this optimum distance from the roll surface when in its rest position.

BRIEF DESCRIPTION OF THE DRAWINGS

The invention will be described further, by way of example only, with reference to the accompanying drawings, in which:

FIG. 2 is a side view of one half of the device of FIG. 1;

FIG. 3b is a section on line A—B of FIG. 3a.

DETAILED DESCRIPTION OF THE PREFERRED EMBODIMENT

Figure 1:
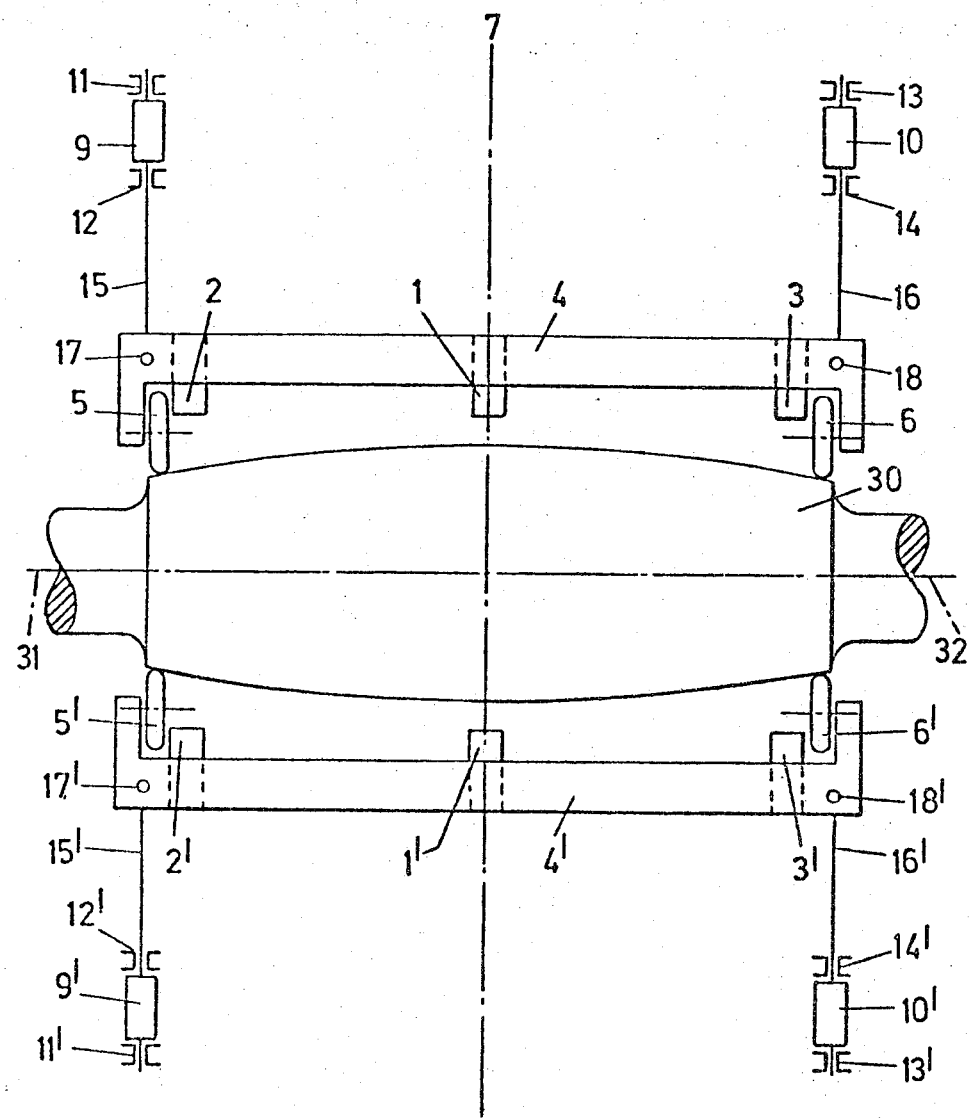
FIG. 1 is a diagrammatic plan view of a device for measuring the chamber of a roll, which is also shown.

In FIG. 1, there is shown a rolling-mill roll 30 whose camber is to be measured. The roll 30 is capable of rotating about its longitudinal axis 31-32. During rolling operations, this roll is subjected to displacements and deformations, for which the measurement device is designed to make allowance.

Two rigid, mobile longitudinal members 4 and 4' are disposed parallel to the axis of rotation 31-32 of the roll 30 and are each provided with three measuring pick-ups 1, 2, 3 and 1', 2', 3' respectively. These longitudinal members 4 and 4' are also each provided with two pairs of idle rollers 5, 6 and 5', 6', which are intended to come into contact with the surface of the roll 30. The pairs of rollers 5, 6 and 5', 6' are disposed on the corresponding longitudinal member 4, 4' symmetrically in relation to the horizontal median axis 7-8 and approximately at the ends of each longitudinal member. The axis 7-8 is perpendicular to the longitudinal members 4 and 4' and passes through the center of their length. As shown in FIG. 2, the rollers of each pair 5, 6, 5', 6' are located one above the other. The rollers are made of steel and have a surface hardness substantially equal to that of the roll; they are cambered, as can be seen from FIG. 3a.

The mechanism for applying force to each longitudinal member 4 and 4', for the purpose of bringing the pairs of rollers 5 and 6, 5' and 6' into contact with the working surface of the roll 30, is made up of two pneumatic jacks 9 and 10, 9' and 10', the axes of which are horizontal, substantially parallel with one another and perpendicular to the longitudinal axis of the longitudinal members 4 and 4'.

Each of rods 15, 16, 15', 16' of these jacks 9, 10, 9', 10' slides in two fixed bearings (11 and 12 in the case of jack 9, 13 and 14 in the case of jack 10, 11' and 12' in the case of jack 9', 13', and 14' in the case of jack 10') which are located on both sides of the cylinder of each jack so as to prevent longitudinal displacements of the cylinders.

The rods 15, 16, 15', 16' of the jacks 9, 10, 9', 10' each end in a vertical swivel-pin 17, 18, 17', 18', respectively, around which there slides a corresponding, vertical, cylindrical ball-bearing 19, 20, 19', 20' respectively. The bearings 19, 20 are mounted in the longitudinal member 4, and the bearings 19', 20' are mounted in the longitudinal member 4'.

The vertical movement of the longitudinal members 4 and 4' is limited by coil springs 21 and 22, 21' and 22'.

Figure 3B:
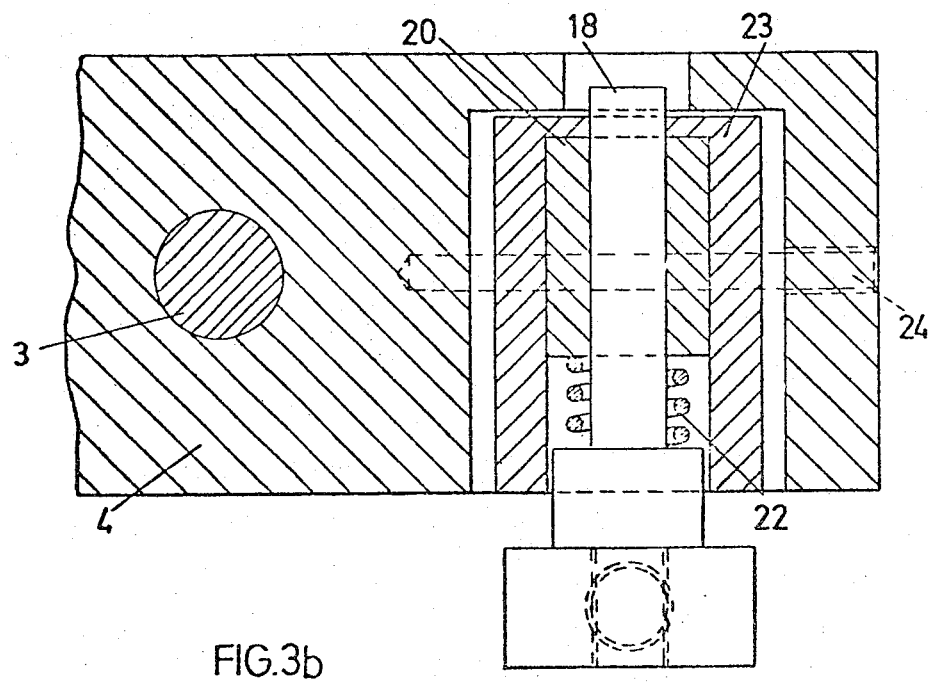
Figure 3A:
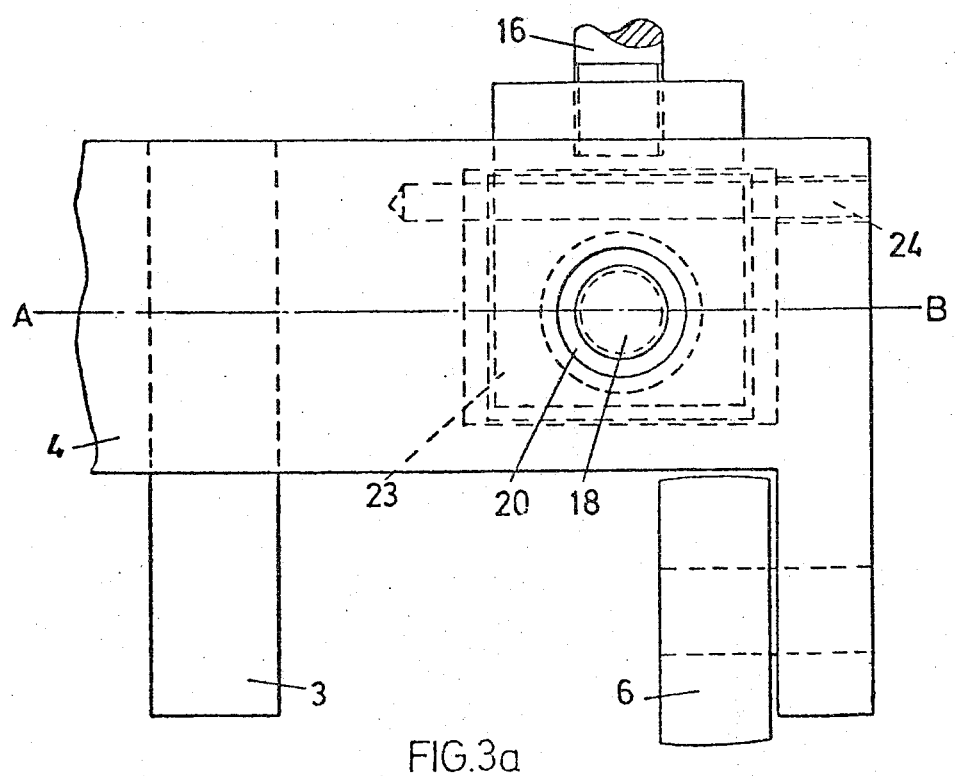
FIG. 3a is a detail of FIG. 1.

As shown in FIGS. 3a and 3b, one of the two vertical bearings (19 and 20 in the case of longitudinal member 4, 19' and 20' in the case of longitudinal member 4') is accommodated in a part 23, 23' which is capable of sliding along a gudgeon 24, 24' in a direction parallel to the longitudinal axis of each longitudinal member 4 and 4'. For this purose, each of the parts 23, 23' comprises a bore in which the corresponding gudgeon 24, 24' slides.

The jacks 9, and 10, 9', and 10' are fixed to a stable support which is rigid either with the roll-stand housing or with the foundations of the roll-stand.

Before starting the measuring operations, the device is generally in the position indicated in FIG. 1, but with the rollers 5, and 6, 5', and 6' at a distance from the working surface of the roll 30. The rods 15, 16, 15', 16' of the jacks 9, 10, 9', 10' are horizontal, parallel in pairs, and perpendicular to the longitudinal axis of the corresponding longitudinal member 4 and 4'.

The three measuring pick-ups 1, 2, 3 and 1', 2', 3' fixed on each longitudinal member 4 and 4' have their axes in the horizontal position and perpendicular to the axis of rotation 31-32 of the roll 30.

First of all, the initial camber of the roll 30 at rest is measured and, for this purpose, the independent jacks 9 and 10, 9' and 10' are actuated in order to bring the rollers 5 and 6, on the one hand, and 5' and 6', on the other hand, into contact with the working surface of the roll 30. This initial camber is subsequently adopted as a reference value, in relation to which the development of the camber in the course of the rolling work will be observed.

The roll 30 is caused to rotate by a conventional drive (not shown) and the prescribed rolling schedule is carried out.

The rollers 5, 6, 5', 6' are kept in contact with the roll 30 as a result of the force exerted by the jacks 9, 10, 9', 10'. The longitudinal members 4 and 4' remain substantially parallel to one another and the distance existing between the pick-ups 1 and 1', 2 and 2', 3 and 3' remain substantially constant, whatever the displacements to which the roll 30 may be subjected. Characteristics of this kind may be ensured owing to the various degrees of freedom possessed by the connection linking each longitudinal member 4 and 4' with the rods 15 and 16, 15' and 16' of the corresponding jacks 9 and 10, 9' and 10'.

As a result of this arrangement, the measuring pick-ups 1, 2, 3 and 1', 2', 3' remain in the correct position, with their axes substantially horizontal and perpendicular to the axis 31-32 of rotation of the roll 30.

I claim:

1. A method of measuring the camber of a roll, comprising the steps of: providing at least two pairs of distance measuring elements at spaced positions along the roll, the distance measuring elements of each pair being diametrically opposed with respect to the cross-section of the roll, with their measuring axes lying substantially on the prolongation of a given diameter of the roll, each of the elements being contactlessly spaced from the surface of the roll, constraining the elements to follow the translational movements of the roll so that the elements of each pair remain diametrically opposed at a substantially constant distance apart, measuring the distance of each element from the surface of the roll along the diameter thereof, and calculating a value representing the camber from the measured distances.

2. A method as claimed in claim 1, wherein the step of calculating the value representing the camber from the distance measurements includes the step of subtracting the sum of the distance measurements obtained by a pair of distance measuring elements located in the middle of the roll from the sum of the distance measurements obtained by a pair of distance measuring elements located at one end of the working surface of the roll.

3. A method as claimed in claim 1, wherein the distance measuring elements are mounted on rollers and, further comprising the step of forcing the elements towards the roll during measurements so that the rollers are in continuous contact with the roll.

4. A method as claimed in claim 3, wherein the distance measuring elements are aligned in a diametrical direction on two opposite sides of the roll, and the elements on each side are mounted on a rigid longitudinal member carrying the rollers, and further including the step of exerting a sufficient force upon the longitudinal member to keep the rollers in cotinuous contact with the roll throughout the duration of the measuring operations.

5. A method as claimed in claim 4, providing each longitudinal member with four rollers which are arranged in pairs, the rollers of each pair being located one above the other.

6. A method as claimed in claim 5, providing the two pairs of rollers symmetrically and approximately at the ends of the longitudinal members, the roller bearing against the roll only outside its effective working surface.

7. A method as claimed in claim 4, wherein the step of exerting the force upon the longitudinal member is accomplished through an articulated connecting means for joining the longitudinal member to a mechanism for exerting the force.

8. A method as claimed in claim 7, providing the articulated connecting means with a vertical axis.

9. A method as claimed in claim 8, providing the articulated connecting means with a degree of freedom for rotation about its vertical axis.

10. A method as claimed in claim 9, providing the articulated connecting means with a degree of freedom for translational movement of the longitudinal member along the vertical axis of the articulated connecting means.

11. A method as claimed in claim 8, providing the articulated connecting means with a degree of freedom for rotation about an axis parallel to the longitudinal axis of the longitudinal member.

12. A method as claimed in claim 8, providing the articulated connecting means with a degree of freedom for horizontal translation of its vertical axis parallel to the longitudinal axis of the longitudinal member.

13. A method as claimed in claim 5, further including the step of exerting the force upon the longitudinal member at two positions which are spaced apart.

14. A method as claimed in claim 13, further including the step of applying the two positions of the force near the pairs of rollers.

15. A method as claimed in claim 13, further including the steps of exerting the force via two articulated connecting means, each being provided with a vertical axis and one of the connecting means being provided with a degree of freedom consisting of a horizontal translation movement of the vertical axis of the connection, parallel to the longitudinal axis of the longitudinal member.

16. A method as claimed in claim 4, further including the step of fixing the distance measuring elements on the longitudinal member in such a way that their axes are substantially perpendicular to the longitudinal axis of the longitudinal member and are substantially horizontal.

17. An arrangement for measuring the camber of a roll, comprising at least two pairs of distance measuring elements mounted contactlessly at spaced positions along the roll, said distance measuring elements of each pair being disposed diametrically opposed with respect to the cross-section of the roll, with their measuring axes lying substantially on the prolongation of a given diameter of the roll, means for mounting said elements so that they are constrained to fllow the translational movements of the roll and so that the elements of each pair remain diametrically opposed at a substantially constant distance apart, and each element having means for measuring its distance from the surface of the roll along the corresponding diameter.

18. An arrangement as claimed in claim 17, further comprising a rigid longitudinal member disposed on each side of the roll; at least two of said distance measuring elements mounted on each said longitudinal member; a pair of rollers located symmetrically and approximately at the ends of each said longitudinal member; two force-applying mechanisms for applying to the respective longitudinal members a force of sufficient magnitude to ensure contact between said rollers and the surface of the roll; articulated connecting means for joining each said longitudinal member to the respective force-applying mechanism; and means for securing said mechanisms to a stable support.

19. An arrangement as claimed in claim 18, wherein said rollers are cambered.

20. An arrangement as claimed in claim 18, wherein said rollers are made of steel.

21. An arrangement as claimed in claim 18, wherein the surface of said rollers has a hardness comparable to that of the roll.

22. An arrangement as claimed in claim 18, wherein each said force-applying mechanism applies the force in a direction substantially perpendicular to the longitudinal axis of the longitudinal member.

23. An arrangement as claimed in claim 18, wherein each said force-applying mechanism comprises at least one jack having a horizontal stroke.

24. An arrangement as claimed in claim 23, wherein said jack is pneumatically controlled.

25. An arrangement as claimed in claim 18, wherein said articulated connecting means linking said longitudinal member and said force-applying mechanism consists of two such means which are place at two positions of application on the longitudinal member, said mechanism comprising two jacks having rods which are directly connected to said articulated connecting means at said two positions respectively, said rods being substantially parallel to one another and perpendicular to the longitudinal axis of said longitudinal member.

26. An arrangement as claimed in claim 23, wherein a rod of said jack slides in two fixed bearings located on either side of a cylinder of said jack for preventing longitudinal displacement of the cylinder.

27. An arrangement as claimed in claim 18, in which said articulated connecting means linking said longitudinal member and said forceapplying mechanism comprises a vertical swivel-pin, a horizontal rod fixed rigidly to said swivel pin, and a vertical bearing which is mounted in said longitudinal member and receives said swivel-pin.

28. An arrangement as claimed in claim 27, wherein said bearing comprises a cylindrical ball bearing for allowing vertical translation movement of said bearing along said vertical swivel-pin.

29. An arrangement as claimed in claim 27, wherein said vertical swivel-pin is provided with a vertically acting spring through the agency of which said longitudinal member is supported around said swivel-pin for self-centering of said longitudinal member in relation to the roll so that the axes of the distance measuring elements and the axis of rotation of the roll define a substantially horizontal plane.

30. An arrangement as claimed in claim 27, wherein said articulated connecting means linking said longitudinal member and said force-applying mechanism consists of two such means which are placed at two positions of application on said longitudinal member, said mechanism comprising two jacks, and the vertical bearing at one of these two positions being provided with a bore which slidingly receives a gudgeon mounted in said longitudinal member in a direction parallel to the longitudinal axis of said longitudinal member.

* * * * *